(12) United States Patent
Chen

(10) Patent No.: US 8,094,931 B2
(45) Date of Patent: Jan. 10, 2012

(54) METHOD OF COLOR COMPONENTS COMPRESSION

(75) Inventor: Ying-Ru Chen, Tainan County (TW)

(73) Assignee: Himax Technologies Limited, Tainan (TW)

( * ) Notice: Subject to any disclaimer, the term of this patent is extended or adjusted under 35 U.S.C. 154(b) by 665 days.

(21) Appl. No.: 12/330,827

(22) Filed: Dec. 9, 2008

(65) Prior Publication Data

US 2010/0142812 A1   Jun. 10, 2010

(51) Int. Cl.
 *G06K 9/36* (2006.01)
 *G06K 9/46* (2006.01)
 *G06K 9/00* (2006.01)

(52) U.S. Cl. ....................... 382/166; 382/240

(58) Field of Classification Search .................. 382/162, 382/164, 166, 218–220, 232, 233, 236, 240; 375/240.03, 240.05, 341; 348/14.13, 223.1, 348/333.11, 333.12, 415, 416, E5.047, E9.01
See application file for complete search history.

(56) References Cited

U.S. PATENT DOCUMENTS

| | | | | |
|---|---|---|---|---|
| 5,970,173 A * | 10/1999 | Lee et al. | .................. | 382/236 |
| 5,982,438 A * | 11/1999 | Lin et al. | .................. | 375/240.12 |
| 6,091,777 A * | 7/2000 | Guetz et al. | .................. | 375/240.11 |
| 6,778,216 B1* | 8/2004 | Lin | .................. | 348/333.11 |
| 7,149,262 B1* | 12/2006 | Nayar et al. | .................. | 375/341 |
| 7,190,723 B2* | 3/2007 | Schoenblum | .................. | 375/240.05 |
| 7,376,265 B2* | 5/2008 | Huang | .................. | 382/166 |
| 7,830,409 B2* | 11/2010 | Hwang et al. | .................. | 348/14.13 |
| 2010/0142812 A1* | 6/2010 | Chen | .................. | 382/166 |

* cited by examiner

*Primary Examiner* — Amir Alavi
(74) *Attorney, Agent, or Firm* — J.C. Patents

(57) ABSTRACT

A method of color components compression is provided. In the present method, when receiving video data encoded by a 4:4:4 sampling format, color components of each set of neighboring pixels in the video data is down-sampled and a first difference of the color components between the video data before and after down-sampling in a down-sampling mode is calculated. Then, the color components of each pixel in the video data are truncated and a second difference of the color components between the video data before and after truncation in a truncation mode is calculated. The first difference and the second difference are compared and the down-sampling mode or the truncation mode that has a smaller difference is selected to compress the video data into a 4:2:2 sampling format.

11 Claims, 3 Drawing Sheets

METHOD OF COLOR COMPONENTS COMPRESSION

BACKGROUND OF THE INVENTION

1. Field of the Invention

The present invention generally relates to a compression method, and more particularly, to a method of color components compression.

2. Description of Related Art

For a general integrated circuit (IC) design, the size of data transferring between the IC and a memory is considered as a major factor that limits the performance of the IC. To reduce the time for transferring the data and the space for storing the data, a data compression process is usually executed before storing the data into the memory if the size of data to be stored is relatively large.

In a general video data compression process, the video data is compressed into standard compression formats, such as H.261, H.263, MPEG-1, MPEG-2, and MPEG-4, and then the compressed video data is stored into the CD/DVD disk. When there is a need to read the stored video data, the compressed data is first de-compressed and then stored into the memory. Since the data rate of the de-compressed data is extremely high, some simple compression/de-compression methods, which can process data real time, should be applied on the data path between IC and memory.

However, as the video data is compressed, some details of the video data may be lost while executing aforesaid compression processes. Accordingly, how to compress the video data into smaller size without affecting the quality of the video data is a main issue for the manufacturer to resolve.

SUMMARY OF THE INVENTION

In light of the above, the present invention provides a method of color components compression, in which two compression modes are used to compress video data so as to reduce the size of the video data while maintaining quality thereof.

In order to achieve the above-mentioned or other objects, the present invention provides a method of color components compression. In the present method, when receiving video data encoded by a 4:4:4 sampling format, color components of each set of neighboring pixels in the video data is down-sampled and a first difference of the color components between the video data before and after down-sampling in a down-sampling mode is calculated. Then, the color components of each pixel in the video data are truncated and a second difference of the color components between the video data before and after truncation in a truncation mode is calculated. The first difference and the second difference are compared and the down-sampling mode or the truncation mode that has a smaller difference is selected to compress the video data into a 4:2:2 sampling format.

According to an embodiment of the present invention, the video data is divided into a plurality of sets of neighboring pixels and each set comprises two pixels.

According to an embodiment of the present invention, in the step of down-sampling color components of each set of neighboring pixels in the video data, the color components of one of the two pixels in each set of neighboring pixels are retained and those of the other pixel are ignored.

According to an embodiment of the present invention, in the step of truncating the color components of each pixel in the video data, the last 4 bits of the color components of each pixel in the video data are truncated.

According to an embodiment of the present invention, the step of truncating the color components of each pixel in the video data further comprises calculating a decimal value of the last 4 bits of the color component of each pixel and determining whether the decimal value is larger than 8, in which if the decimal value is larger than 8, the fifth bit of the color component is carried by one.

According to an embodiment of the present invention, after the video data is compressed into the 4:2:2 sampling format, the method further stores the compressed video data in a memory.

According to an embodiment of the present invention, before storing the compressed video data in the memory, the method further comprises storing an indicator in the last bit of the luminance of each pixel, in which the indicator records the mode selected for compressing the color components of the pixel.

According to an embodiment of the present invention, after storing the compressed video data in the memory, the method further comprises decompressing the compressed video data in the memory.

According to an embodiment of the present invention, in the step of decompressing the compressed video data in the memory, the indicator of each pixel of the compressed video data from the memory is accessed so as to determine the mode selected for compressing the color components of the pixel. If the compression mode is determined as the down-sampling mode, the color components of neighboring pixels are weighted summed (color components of a left pixel+color components of a right pixel)/2 and used as the color components of the pixel therebetween in each set of neighboring pixels. If the compression mode is determined as the truncation mode, the recorded color components of each pixel are shifted by 4 bits and the last 4 bits of the color components are filled in by zeros. Finally, the decompressed video data in the 4:4:4 sampling format is outputted.

According to an embodiment of the present invention, before outputting the decompressed video data in the 4:4:4 sampling format, the method further checks whether the decompressed luminances of the two pixels adjacent to each pixel are the same but different from the decompressed luminance of the pixel therebetween and if yes, the color components of the pixel are modified with the color components of the neighboring pixels thereof.

According to an embodiment of the present invention, the color components comprise U color components and V color components.

In the present invention, a direct down-sampling and a truncation is performed on the received video data and the compressed video data is compared with the original video data so as to decide a best mode to compress the video data. Accordingly, the size of color components of the video data can be reduced while the quality of the video data can be maintained within a moderate range. As a result, the speed for transmitting the video data can be increased and the space for storing the video can be reduced.

In order to make the aforementioned and other objects, features, and advantages of the present invention comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
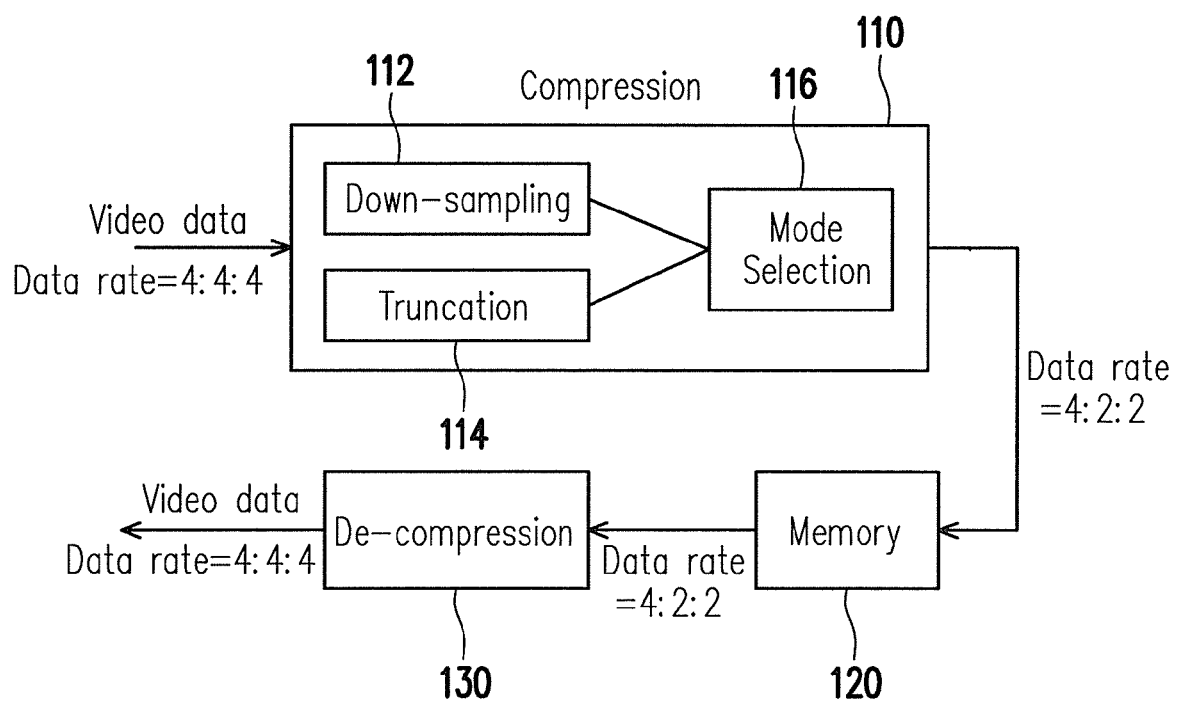
FIG. 1 is a schematic diagram illustrating a method of color components compression according to one embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The color video data are usually transmitted in a format of luminance and color components, in which the luminance retains ninety percent details of the original video data and the color components only retains ten percent details of the original video data. When performing distortion compression on the color video data, the distortion of the luminance is easier to be observed by human eyes. Accordingly, the present invention provides a method for compressing the color components of the video data.

The video data is usually transmitted in a real 4:4:4 sampling format or in a pseudo 4:4:4 sampling format that is interpolated from the video data in a 4:2:2 sampling format. Although both two kinds of video data look like data in a 4:4:4 sampling format, the characteristics of the two video data are still different. Accordingly, if the two video data are both regarded as the data in a 4:4:4 sampling format after being interpolated and are directly sampled and stored into a memory, the characteristics of the data in a real 4:4:4 sampling format will be lost. To reduce the loss of characteristics, the present invention takes use of two different compression modes to compress the video data, so as to reduce the differences between the compressed video data and the original video data.

FIG. 1 is a schematic diagram illustrating a method of color components compression according to one embodiment of the present invention. Referring to FIG. 1, the present embodiment uses two compression methods to compress video data. One of them is a direct down-sampling method, in which for every two pixels, 8 bits of U components and 8 bits of V components of only one of the two pixels are retained. The direct down-sampling method is suitable for compressing data in an area with less variation of color components. The other is a truncation method, in which only 4 bits of U components and 4 bits of V components of each pixel are retained. The truncation method is suitable for compressing data in an area with great variation of color components.

In a compression 110 process, when receiving video data sampled in a 4:4:4 data rate, a direct down-sampling 112 and a truncation 114 are performed on the video data, respectively. The compressed data is then used as a basis in a mode selection 116, in which the differences between the compressed data and the original data are calculated and the mode that has a smaller difference is selected to compress the video data into a 4:2:2 sampling format. Finally, the compressed data sampled in a 4:2:2 data rate is stored in a memory 120.

Next, when a read instruction is received, the compressed video data stored in the memory 120 is retrieved and a decompression 130 is performed on the retrieved compressed video data so as to recover the video data sampled in a 4:4:4 data rate. Finally, the video data is outputted in a normal 4:4:4 sampling format. To describe the details for compressing and decompressing the color components of the video data based on the aforesaid structure, two embodiments are given below for further illustration.

Figure 2:
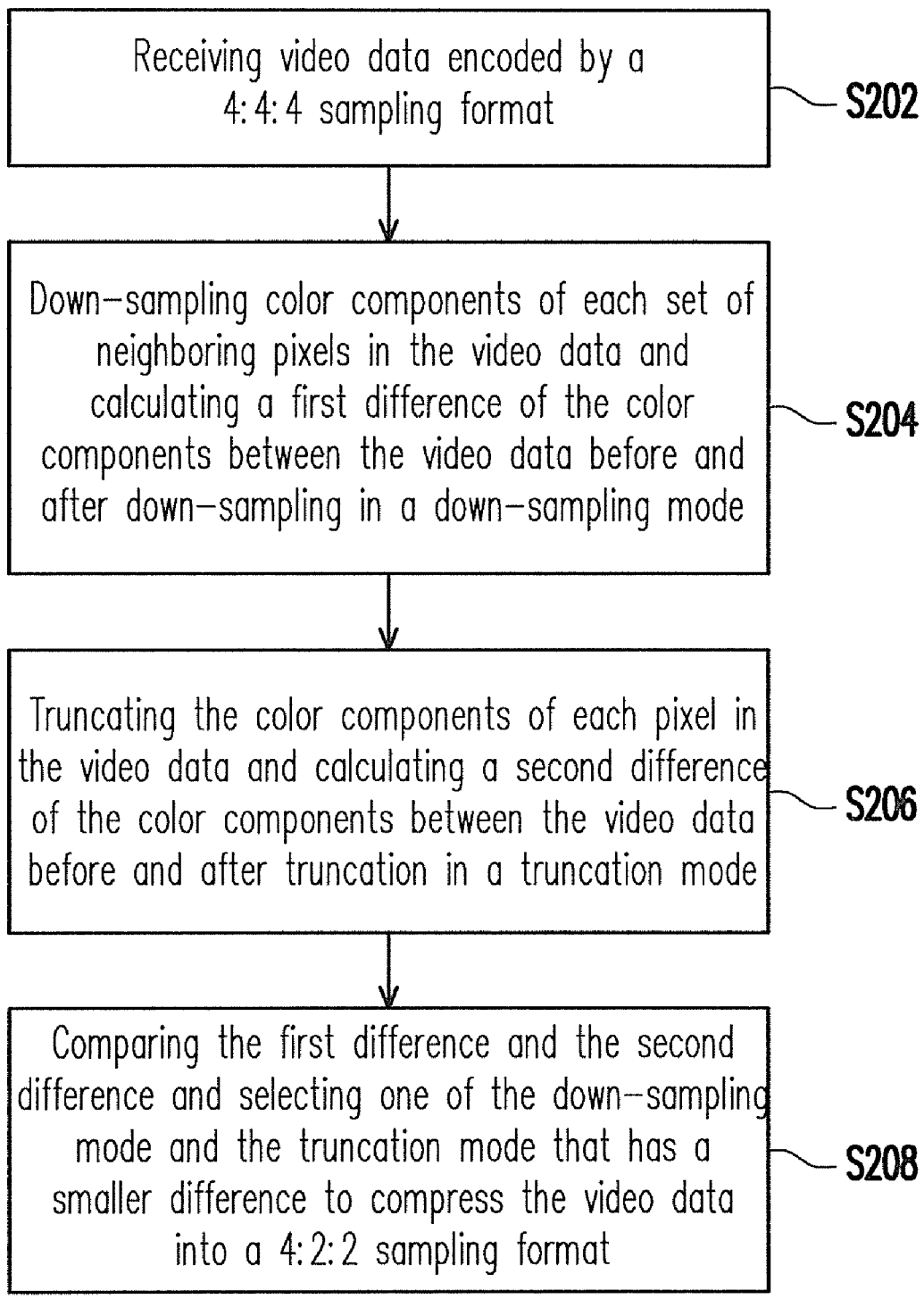
FIG. 2 is a flowchart illustrating a method of color components compression according to one embodiment of the present invention.

FIG. 2 is a flowchart illustrating a method of color components compression according to one embodiment of the present invention. Referring to FIG. 2, the present embodiment describes the flow for compressing video data, in which the video data is originally sampled in a 4:4:4 data rate.

First, the video data encoded by a 4:4:4 sampling format is received (S202), in which the video data can be divided into a plurality of sets of neighboring pixels and each set comprises two pixels.

Then, in a down-sampling mode, the color components of each set of neighboring pixels in the video data is down-sampled and a first difference of the color components between the video data before and after down-sampling is calculated (S204). To be specific, in the down-sampling mode, the color components of one of the two pixels in each set of neighboring pixels are retained while the color components of the other pixel are ignored. When calculating the first difference, the video data being down-sampled into the 4:2:2 sampling format is interpolated to be the video data in the 4:4:4 sampling format and then the difference of color components between the obtained video data in the 4:4:4 sampling format and the originally received video data in the 4:4:4 sampling format is calculated and used as the first difference.

In the meantime, in a truncation mode, the color components of each pixel in the video data are truncated and a second difference of the color components between the video data before and after truncation is calculated (S206). To be specific, in the truncation mode, the last 4 bits of the color components of each pixel in the video data are truncated. When calculating the second difference, the video data being truncated into the 4 bits is expanded into 8 bits and then the difference of color components between the obtained video data in the 4:4:4 sampling format and the originally received video data in the 4:4:4 sampling format is calculated and used as the second difference.

It should be noted herein that in one embodiment, when truncating the color components of each pixel in the video data, a decimal value of the last 4 bits of the color component of each pixel is further calculated and determined whether to be larger than 8. If the decimal value is larger than 8, the fifth bit of the color component is further carried by one. As a result, the truncated color component of the pixel can be closer to the original color component of the pixel since the truncated color component are rounded up or rounded down to the fifth bit of the color component.

Finally, the first difference and the second difference as calculated in the previous steps are compared so as to select the down-sampling mode or the truncation mode that has a smaller difference to compress the video data into a 4:2:2 sampling format (S208). To be specific, if the first difference is smaller than the second difference, the down-sampling mode is selected to compress the video data into a 4:2:2 sampling format. On the other hand, if the second difference is smaller than the first difference, the truncation mode is selected to compress the video data into a 4:2:2 sampling format.

Through the compression method as described above, the size of the video data can be relatively reduced without losing details of the color components thereof, such that the rate for transmitting the video data can be increased and the performance for the IC to access the video data in the memory can be enhanced.

It should be noted herein that the compressed video data can be further transmitted to a memory and stored in the memory. In order to recognize the mode that the video data is actually compressed, the present embodiment further stores an indicator in the last bit of the luminance of each pixel, in which the indicator records the mode selected for compressing the color components of the pixel. Accordingly, an embodiment for illustrating a method for decompressing the video data based on the previously stored indicator is given below.

Figure 3:
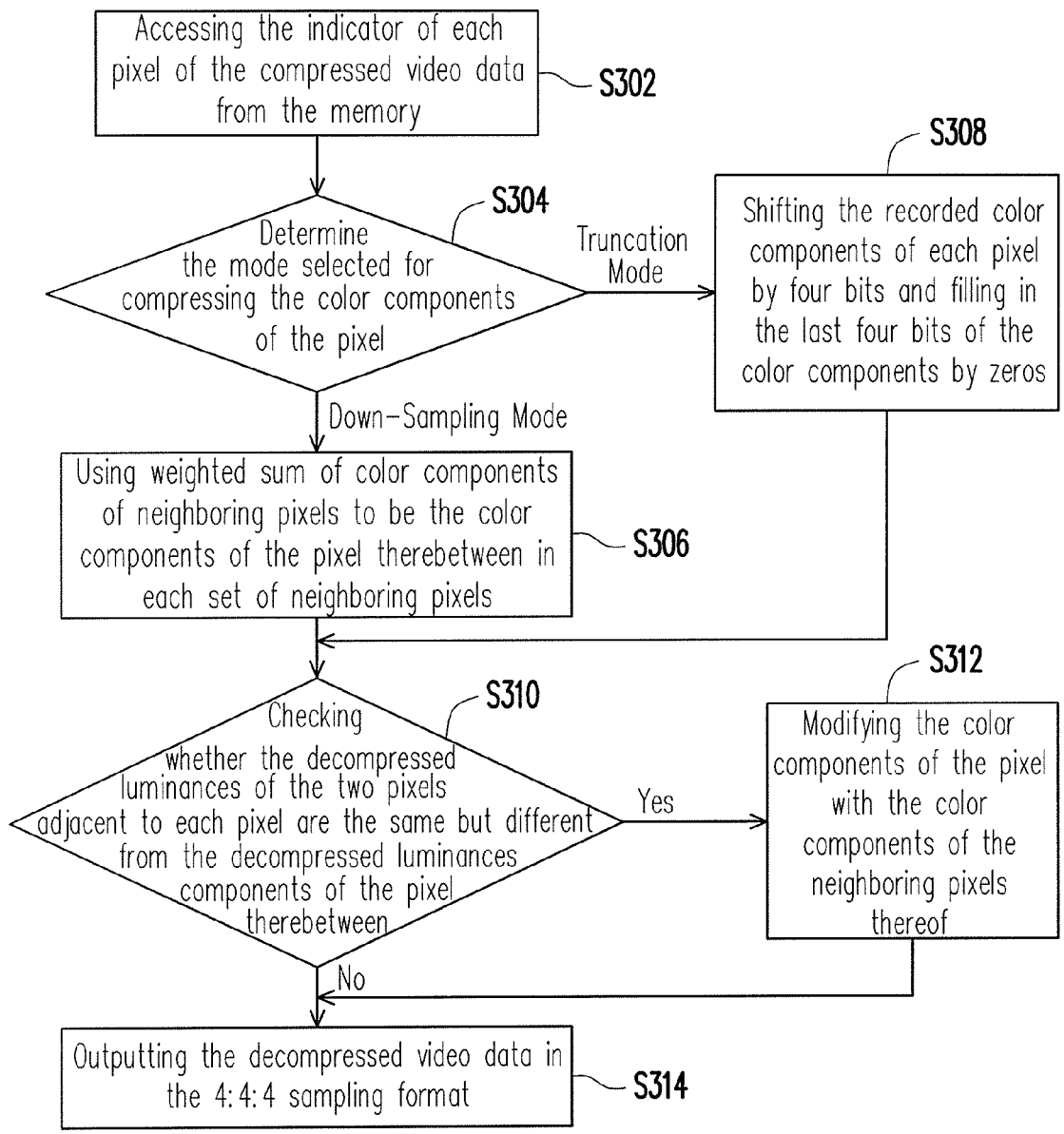
FIG. 3 is a flowchart illustrating a method for decompressing color components of video data according to one embodiment of the present invention.

FIG. 3 is a flowchart illustrating a method for decompressing color components of video data according to one embodiment of the present invention. Referring to FIG. 3, the present embodiment describes the flow for decompressing the video data that has been down-sampled or truncated into the 4:2:2 sampling format and stored in a memory with an indicator recording the mode that the video data is originally compressed.

First, the indicator of each pixel of the compressed video data is accessed from the memory (S302) so as to determine the mode selected for compressing the color components of the pixel (S304). The indicator can be accessed from the last bit of the luminance of each pixel and used to identifying the mode that the pixel is originally compressed. For example, if the indicator is read as 0, the mode for compressing the video data is identified as a direct down-sampling mode. If the indicator is read as 1, the mode for compressing the video data is identified as a truncation mode.

If the compression mode is determined as the down-sampling mode, then the weighted sum of color components of neighboring pixels is used to be the color components of the pixel therebetween in each set of neighboring pixels (S306), so as to recover the video data in the 4:4:4 sampling format. To be specific, the color components of a left pixel and a right pixel adjacent to a target pixel are summed and divided by 2 (color components of a left pixel+color components of a right pixel)/2, and then used as the color components of the target pixel.

If the compression mode is determined as the truncation mode, the recorded color components of each pixel are shifted by 4 bits and the last 4 bits of the color components are filled in by zeros (S308), so as to recover the video data in the 4:4:4 sampling format.

It should be noted herein that in order to reduce obvious difference of luminances among neighboring pixels that may occur in the decompressing process, after the decompression is completed, the present embodiment further checks whether the decompressed luminances of the two pixels adjacent to each pixel are the same but different from the decompressed luminance of the pixel therebetween (S310). If the decompressed luminances of the two pixels adjacent to each pixel are the same but different from the decompressed luminance of the pixel therebetween, the color component of the pixel is modified with the color component of the neighboring pixels thereof (S312).

To be specific, for a target pixel, the present embodiment checks a pixel on the left of the target pixel and a pixel on the of the target pixel and determines whether the luminances of the two neighboring pixels are the same. If the luminances of the two neighboring pixels are the same, the present embodiment further determines whether the luminance of the target pixel is equal to the luminances of the two neighboring pixels. If the luminance of the target pixel is different from that of the neighboring pixels, it can be determined that there is an obvious luminance difference occurred in the target pixel. Therefore, the present embodiment replaces the color component of the pixel with the color component of the neighboring pixels, so as to make the decompressed video data smoother.

Finally, after the "smoothing" process in the steps S310 and S312, the decompressed video data is outputted in the 4:4:4 sampling format (S314). Based on the above decompression method, the video data in the 4:2:2 sampling format can be recovered to the 4:4:4 sampling format while most details of the color components of the video data are retained.

To sum up, the present invention provides a method of color components compression, in which direct down-sampling and truncation are performed on the received video data so as to find a mode with less detail loss to compress the video data, such that the memory space for storing the video data can be reduced while the quality of the video data is still retained. Moreover, only one bit of luminance of each pixel is used as an indicator to record the two compression modes, and by reading the indicator, the mode used to compress the color components of the video data can be recognized and used for correctly decompressing the video data back to the 4:4:4 sampling format.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of color components compression, comprising:
   receiving video data encoded by a 4:4:4 sampling format;
   down-sampling color components of each set of neighboring pixels in the video data and calculating a first difference of the color components between the video data before and after down-sampling in a down-sampling mode;
   truncating the color components of each pixel in the video data and calculating a second difference of the color components between the video data before and after truncation in a truncation mode; and
   comparing the first difference and the second difference and selecting one of the down-sampling mode and the truncation mode that has a smaller difference to compress the video data into a 4:2:2 sampling format.

2. The method for method of color components compression according to claim 1, wherein the video data is divided into a plurality of sets of neighboring pixels and each set comprises two pixels.

3. The method for method of color components compression according to claim 1, wherein the step of down-sampling color components of each set of neighboring pixels in the video data comprises:
   retaining the color components of one of the two pixels in each set of neighboring pixels and ignoring those of the other pixel.

4. The method for method of color components compression according to claim 1, wherein the step of truncating the color components of each pixel in the video data comprises:
   truncating the last 4 bits of the color components of each pixel in the video data.

5. The method for method of color components compression according to claim 4, wherein the step of truncating the color components of each pixel in the video data further comprises:

calculating a decimal value of the last 4 bits of the color component of each pixel;

determining whether the decimal value is larger than 8; and if the decimal value is larger than 8, carrying the fifth bit of the color component by one.

6. The method for method of color components compression according to claim 1, wherein after the video data is compressed into the 4:2:2 sampling format, the method further comprises:

storing the compressed video data in a memory.

7. The method for method of color components compression according to claim 6, wherein before storing the compressed video data in the memory, the method further comprises:

storing an indicator in the last bit of the luminance of each pixel, in which the indicator records the mode selected for compressing the color components of the pixel.

8. The method for method of color components compression according to claim 6, wherein after storing the compressed video data in the memory, the method further comprises:

decompressing the compressed video data in the memory.

9. The method for method of color components compression according to claim 8, wherein the step of decompressing the compressed video data in the memory comprises:

accessing the indicator of each pixel of the compressed video data from the memory so as to determine the mode selected for compressing the color components of the pixel;

if the compression mode is determined as the down-sampling mode, using weighted sum of the color components of neighboring pixels to be the color components of the pixel therebetween in each set of neighboring pixels;

if the compression mode is determined as the truncation mode, shifting the recorded color components of each pixel by 4 bits and filling in the last 4 bits of the color components by zeros; and outputting the decompressed video data in the 4:4:4 sampling format.

10. The method for method of color components compression according to claim 9, wherein before outputting the decompressed video data in the 4:4:4 sampling format, the method further comprises:

checking whether the decompressed luminances of the two pixels adjacent to each pixel are the same but different from the decompressed luminance of the pixel therebetween; and if yes, modifying the color components of the pixel with the color components of the neighboring pixels thereof.

11. The method for method of color components compression according to claim 1, wherein the color components comprise U color components and V color components.

* * * * *